April 12, 1927.  J. P. BURNETT  1,624,580
CONTINUOUS MOVING PICTURE MACHINE
Filed March 5, 1921  4 Sheets-Sheet 3

Witnesses:

Inventor
John P. Burnett
By Joshua R. H. Potts
His Attorney

April 12, 1927. J. P. BURNETT 1,624,580
CONTINUOUS MOVING PICTURE MACHINE
Filed March 5, 1921  4 Sheets-Sheet 4
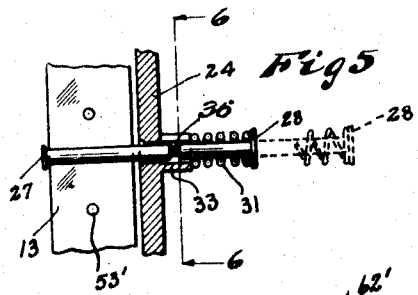
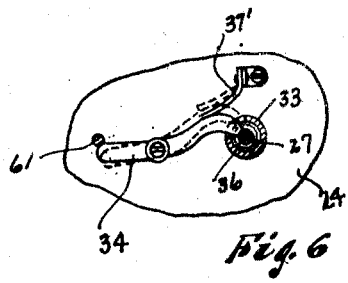
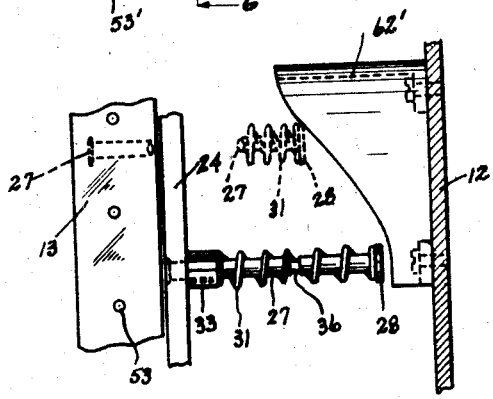
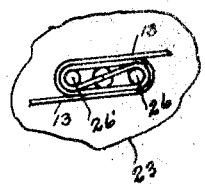
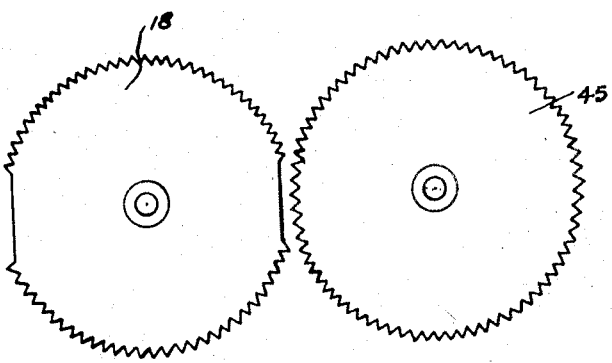
Inventor
John P. Burnett
By Joshua R H Potts
His Attorney Patented Apr. 12, 1927.

1,624,580

UNITED STATES PATENT OFFICE.

JOHN F. BURNETT, OF CHICAGO, ILLINOIS, ASSIGNOR TO AUTOMATIC MOTION PICTURE DISPLAY CO., OF CHICAGO, ILLINOIS, A CORPORATION OF ILLINOIS.

CONTINUOUS MOVING-PICTURE MACHINE.

Application filed March 5, 1921. Serial No. 450,016.

My invention relates to improvements in motion picture machines and has for its principal object the provision of a film magazine designed for use especially in connection with an endless film.

A further object is the provision of a film magazine having two reels provided with means adapted to wind one of the film reels while the other film reel is unwound.

A further object is a provision of a motion picture machine which will be simple in structure, one which may be power driven for commercial purposes and avoiding the employment of an operator.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical section of the film magazine showing a motion picture apparatus mounted thereon.

Fig. 5 is a fragmentary detail view taken substantially on line 5—5 of Fig. 4.

Fig. 6 is a sectional view taken substantially on line 6—6 of Fig. 5.

Fig. 7 is a detail view of the pins employed in the construction upon which a film is wound, about to engage with a cam provided on one of the side walls of the film magazine.

Fig. 8 is a detail view of the pins employed in the construction showing the method of winding the film thereon.

Fig. 9 is a detail view of the saw tooth gears provided in my construction showing a portion of the teeth cut out.

Figure 1:
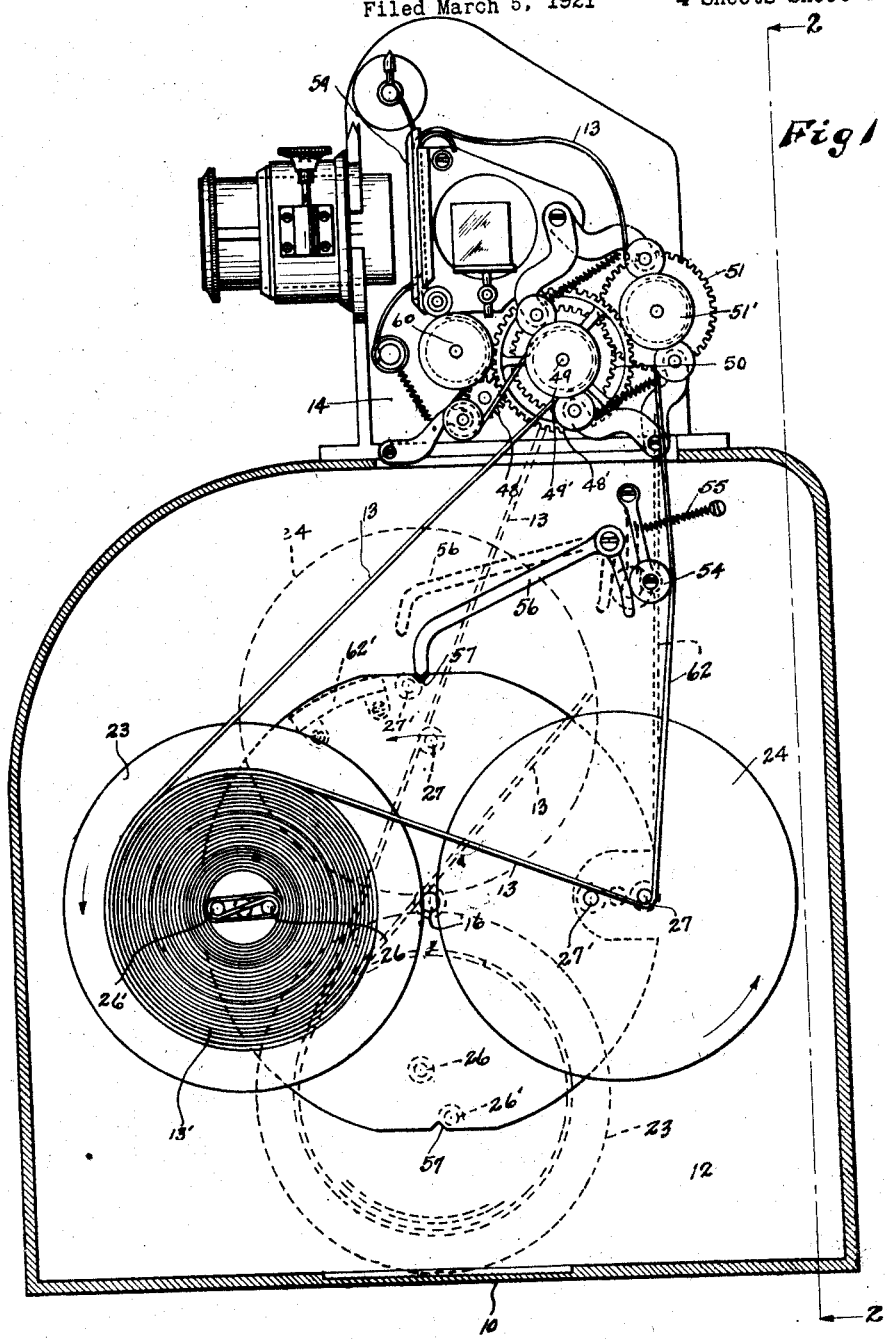
Figure 2:
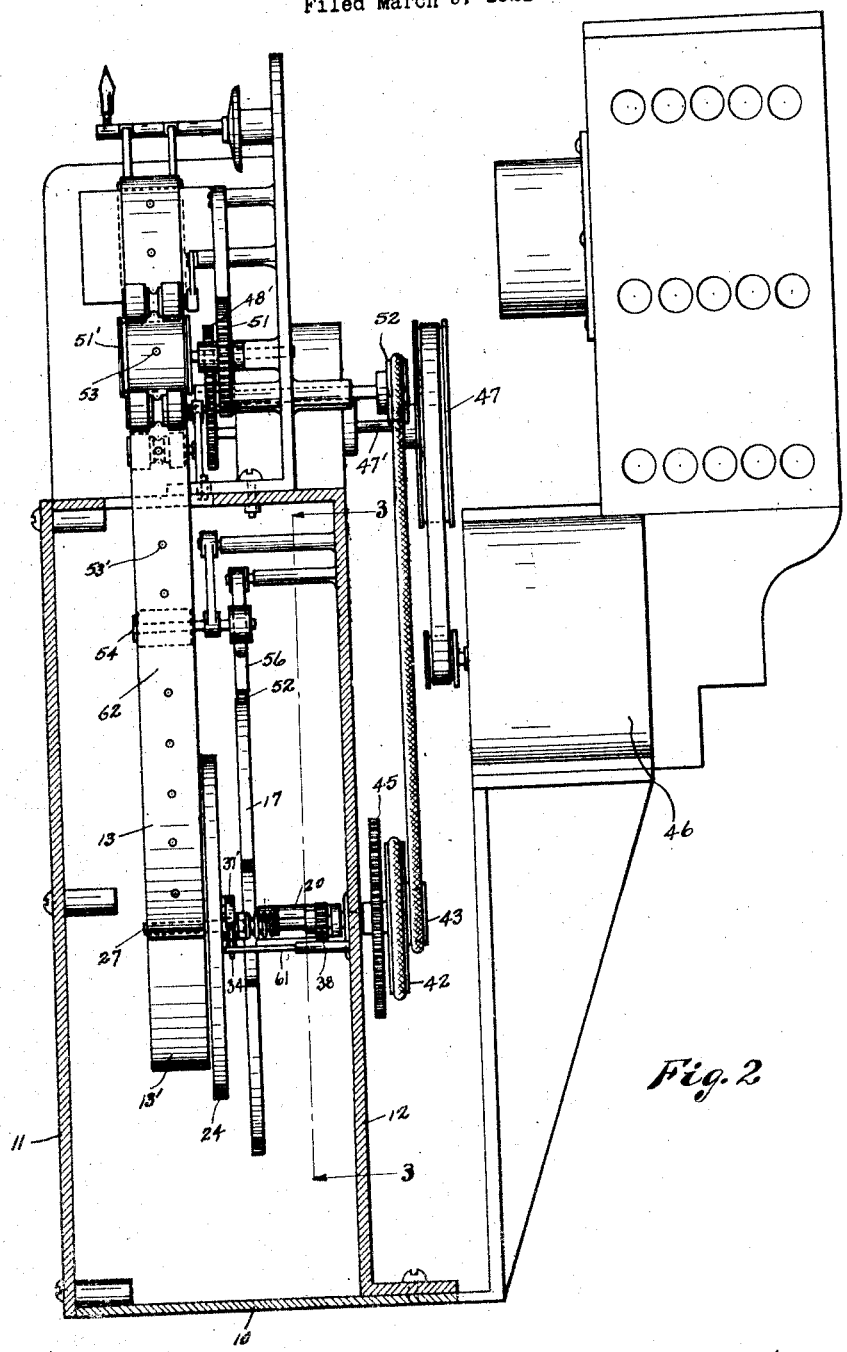
Fig. 2 is a sectional view taken substantially on line 2—2 of Fig. 1.
Figure 3:
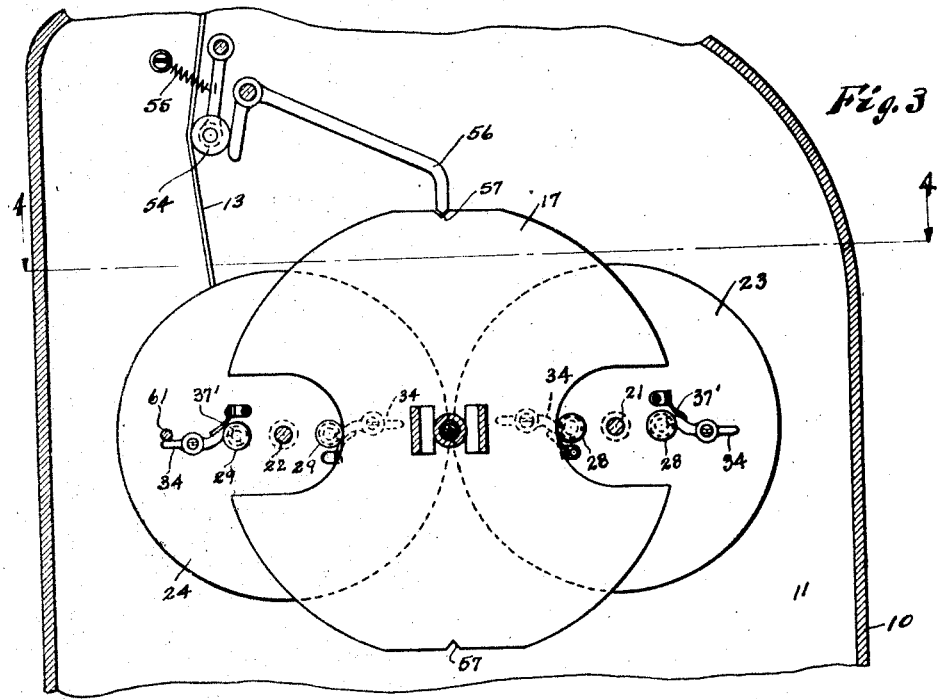
Fig. 3 is a fragmentary sectional view taken substantially on line 3—3 of Fig. 2.
Figure 4:
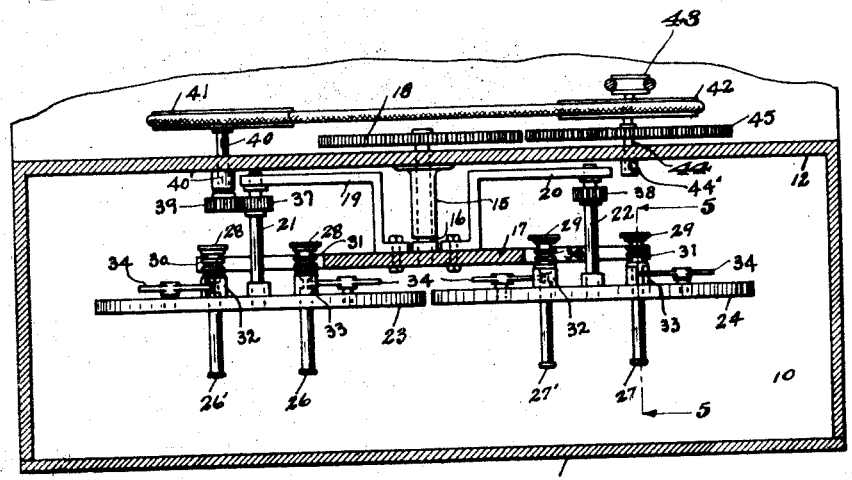
Fig. 4 is a sectional view taken substantially on line 4—4 of Fig. 3.

The preferred form of construction as illustrated in the drawings comprises a housing 10 having side walls 11 and 12. The side wall 11 is removable so that access may be readily had to the film reel when it is desired to renew or remove the same, or make necessary adjustments. A motion picture apparatus 14 is mounted on the housing 10 and is provided with the necessary illumination. A bearing 15 is integrally formed on the side wall 12 having a shaft 16 journalled therein. One end of the shaft 16 is provided with a saw tooth gear 18, the other end of the said shaft 16 having a disk 17 rigidly fixed thereon. Secured to the disk 17 are Z-shaped members 19 and 20 adapted to serve as a support for the shafts 21 and 22. Rigidly fixed on the outer ends of the shafts 21 and 22 are disks 23 and 24 which serve as a support or backing for a film reel 13'. Each of the disks 23 and 24 are provided with pins 26, 26', 27 and 27' upon which a film 13 is wound. The inner ends of the pins 26, 26', 27 and 27' are provided with heads 28 and 29 each of which serves as a retaining member for a resilient spring 30 and 31 when pressing against shoulders 32 and 33. The shoulders 32 and 33 are integrally formed on the back of the disks 23 and 24. A portion of the shoulders 32 and 33 are cut out to allow a dog 34 to engage with a groove 36 provided on the pins 26, 26', 27 and 27'. The dog 34 is provided with a spring 37' adapted to hold the dog 34 in operative position. Rigidly fixed on the shafts 21 and 22 are gears 37 and 38 which are adapted to engage with a gear 39 and rotate the disks 23 or 24 when rewinding the film 13. The gear 39 is fixed to one end of a shaft 40 journalled in a bearing 40' integrally formed on the side wall 12. The other end of the shaft 40 is provided with a pulley 41 driven by a pulley 42 which in turn is driven by a pulley 43. The pulleys 42 and 43 are rigidly fixed to a shaft 44 journalled in a bearing 44' integrally formed on the side wall 12. A saw tooth gear 45 is provided on the shaft 44 and meshes with the saw tooth gear 18 which rotates the disk 17. A motor is provided in the housing 46 and drives a pulley 47 fixed on one end of a shaft 47'. A gear 48 is mounted on the other end of the shaft 47' and meshes with a gear 48' fixed on a shaft 49 and rotates a roller 49'. Fixed on the shaft 49 adjacent to the gear 48' is a gear 50 which meshes with a gear 51. The gear 51 rotates the roller 51'. Rigidly fixed to the outer end of the shaft 49 is a pulley 52 which drives the pulley 43. The gears are so arranged that the disks 17, 23 and 24 will rotate with as great a speed as the rollers 49' and 51' which govern the speed of the film 13. The rollers 49' and 51' are provided with pins 53 which engage with perforations 53' provided in the film 13 and prevents the said film from slipping and provides a steady movement of the film. Swingingly mounted on the side wall 12 is a roller 54 held in engagement with a portion 62 of the film 13 by a spring 55. The roller 54 is arranged to throw out of engagement, when the portion 62 of the film 13 is tightened, a dog 56 which engages with a notch 57 provided on the disk 17.

In operation the ends of the film 13 are secured together by cement or any other suitable material, forming a continuous film. The film 13 is then wound on the pins 26 and 26' carried on the disk 23, in the manner illustrated in Fig. 8 of the drawings. After the film 13 has been completely wound into a reel the portion 62 of the film 13 passes around the pin 27 carried on the disk 24 and around the roller 51' through a guide member 59 passing over a roller 60 and around the roller 49' and then rewinding on the pins 27 and 27' after the disk 24 has been shifted into winding position. The disk 23 as illustrated in Fig. 1 of the drawings has completed its winding operation and is now ready to be swung into a position where the said film will go through the unwinding operation. This is accomplished by the tightening of the portion 62 of the film 13 between the pin 27 and the roller 51. By the tightening of the portion 62 of the film 13 the roller 54 is forced backwards and raises the dog 56 which holds the disk 17 stationary while the film 13 is wound and unwound. When the film 13 is completely unwound from the pins 27 and 27' and completely wound upon the pins 26 and 26', the portion of the film between the film reel 13' and the roller 51' becomes taut to such an extent that the pin 27 is forced upwardly causing the saw-toothed gear 18 to mesh with the saw-toothed gear 45, rotating the disk 17 which carries the disk 24 into winding position. A portion of the teeth on the gear 18 are cut away to allow the gear 18 to idle when the film 13 goes through its winding and unwinding operation. When the disk 24, which is carried by the disk 17, is swung into winding position the dog 34 engages with a pin 61, mounted on the side wall 12, disengaging the dog 34 with the groove 36 and the resilient spring 30 forces the pin 27' in so as to allow the pin 27' to freely pass under the portion 62 of the film 13. At the desired point the head 29 of the pin 27' engages with a cam 62' provided on the side wall 12 and is forced back into operative position and engages with the film 13 as shown by dotted line in Fig. 1 of the drawings. After the disk 24 is swung into winding position and the disk 23 is swung into unwinding position the portion 62 of the film 13 loosens and a spring 55 forces the roller 54 backward allowing the dog 56 to engage with the notch 57 holding the disk 17 stationary. The gear 37 mounted on the shaft 21 which is rigidly fixed to the disk 24 meshes with the gear 39 and continues to rotate the disk 23 or 24 until the film 13 is completely wound and swung into its unwinding position.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. The combination with a motion picture apparatus and a film magazine, of a continuous film magazine passing into and out of said magazine; and a pair of co-operating interchangeable oppositely disposed film receiving means, said means being interchangeable by the direct interengagement of the film with, and the application of its tension to one of the film receiving means, substantially as described.

2. The combination with a motion picture apparatus and a film magazine, of a continuous film passing into and out of said magazine; and a pair of interchangeable oppositely disposed retractible film receiving pins, said pins being intermittently interchanged in position by the tension of the film directly applied to one of said pins, substantially as described.

3. The combination with a motion picture apparatus and a film magazine, of a continuous film; a pair of co-operating interchangeable film reels, said reels being intermittently interchangeable by the tension of said film applied to one of said reels; and means operable by the tension of said film for permitting the interchanging operation of said reels, substantially as described.

4. In combination with a motion picture film magazine comprising a housing; a central disk rotatably mounted on one of the side walls of said housing; supporting means mounted on the said central disk; a plurality of disks rotatably mounted on said supporting means; laterally extending pins positioned on each of said disks arranged to receive a film; means for holding said pins in operative position; resilient means for throwing said pins out of engagement with a portion of the said film; a cam mounted on one of the side walls of the said housing arranged to force the pins into operative position when the said disks are shifted from winding into unwinding operation, substantially as described.

5. In combination with a film magazine comprising a housing; a central disk rotatably mounted on one of the side walls of said housing; supporting means mounted on said central disk; a plurality of disks rotatably mounted on said supporting means; laterally extending pins positioned on each of said disks arranged to receive a film; means for holding said pins in operative position; a resilient spring arranged to force one of the said pins out of engagement with a portion of the said film; and means for forcing said pins into operative position when one of the said disks are shifted from winding into unwinding operation; substantially as described.

6. In combination with a film magazine comprising a housing; a central disk rotatably mounted on one of the side walls of said housing; supporting means mounted on said central disk; a plurality of disks rotatably mounted on said supporting means; laterally extending pins positioned on each of said disks arranged to receive a film; means for holding said pins in operative position; a resilient spring arranged to force one of the said pins out of engagement with a portion of the said film; means for forcing said pins into operative position when one of the said disks are shifted from winding into unwinding operation; and means for holding the said central disk stationary while the other of said disks is operative, substantially as described.

7. In combination with a film magazine comprising a housing; a central disk rotatably mounted on one of the side walls of said housing; supporting means mounted on said central disk; a plurality of disks rotatably mounted on said supporting means; laterally extending pins positioned on each of said disks arranged to receive a film; means for holding said pins in operative position; a resilient spring arranged to force one of the said pins out of engagement with a portion of the said film; means for forcing said pins into operative position when one of the said disks are shifted from winding into unwinding operation; and means for holding the said central disk stationary while the other of said disks is operative; and means for releasing said holding means when the other of said disks is shifted from winding into unwinding operation, substantially as described.

8. In a motion picture machine, a projector, an endless film adapted to traverse said projector, winding and unwinding reels adapted to wind and unwind said film in double layers, the layers passing to the winding reel being led, respectively, from the projector and from the unwinding reel, and the layers unwound from the unwinding reel being passed, respectively, to the projector and the winding reel, a carrier upon which said reels are mounted, rotatable to bring the reels successively into winding and unwinding positions, each reel being constructed to interengage with the film, and the interengagement with the unwinding reel being maintained to develop tension upon said unwinding reel when the film is exhausted therefrom and positively move the carrier by the direct application of the tension of the film, means for positively completing rotation of the carrier to bring a reel into winding position after rotation has been initiated by the said tension of the film, means for releasing interengagement of the unwinding portion of the film with the unwinding reel after such movement of the carrier has been initiated and causing re-engagement with said reel of a winding portion of the film as the reel approaches the winding position, the interengagement of the film with the reel in winding position being maintained during the movement of said winding reel to the unwinding position and until the film is unwound therefrom, and means normally engaging the carrier to resist its rotation but acted upon by the tension of the film which is imparted to the unwound reel.

9. The combination with a motion picture apparatus and a film magazine, of a continuous film passing into and out of said magazine; a pair of interchangeable retractible fingers adapted to receive and discharge said film; means for holding said fingers against retraction; and means engaging said holding means for preventing the retraction of said fingers, substantially as described.

10. In combination with a motion picture apparatus, two reels in operative relation thereto, each of said reels comprising two projecting adjacent pins, one of the pins in each reel being retractable; a continuous film passed through said motion picture apparatus, the inoperative end of said film being doubled and wound on said reels, one strand being led from one of said reels through said motion picture apparatus and winding into the other reel, the other strand passing directly to said other reel and winding thereon; and automatic means operable by the tension in said film for reversing the positions and operation of said reels and temporarily retracting the retractable pin on the unwinding reel, substantially as described.

11. The combination with a motion picture apparatus and a film magazine, of a continuous film passing into and out of said magazine; a pair of interchangeable retractible fingers adapted to receive and discharge said film; means for holding said fingers against retraction; means engaging said holding means for preventing the retraction of said fingers; and means for forcing said fingers out of retracted position, substantially as described.

12. The combination with a motion picture apparatus and a film magazine, of a continuous film passing into and out of said magazine; a pair of co-operating reels interchangeably mounted in said magazine, the core of each of said reels comprising a pair of oppositely disposed retractible fingers adapted to receive and discharge said film; a pawl pivotally mounted on each of said reels and normally engaging said fingers for holding said fingers against retraction; and means adapted upon engagement with said pawl to disengage said pawl from said fingers permitting the retraction of said fingers, substantially as described.

13. The combination with a motion picture apparatus and a film magazine, of a continuous film passing into and out of said magazine; a pair of co-operating reels interchangeably mounted in said magazine, the core of each of said reels comprising a pair of oppositely disposed retractible fingers adapted to receive and discharge said film; a pawl pivotally mounted on each of said reels and normally engaging said fingers for holding said fingers against retraction; means adapted upon engagement with said pawl to disengage said pawl from said fingers permitting the retraction of said fingers; and a cam mounted in said magazine adapted to engage said fingers forcing said fingers out of retracted position, substantially as described.

14. The combination with a motion picture apparatus and a film magazine, of a continuous film passing into and out of said magazine; a reel supporting member rotatably mounted in said magazine; a pair of oppositely disposed interchangeable reels carried by said supporting member adapted to receive and discharge said film, said reels being intermittently interchangeable by the tension of said film applied to one of said reels; oppositely disposed notches formed in the periphery of said supporting member; and a spring held pawl normally engaging said notches preventing the rotation of said supporting member, said pawl being thrown out of engagement with said notches by the tension of said film applied thereto, substantially as described.

15. The combination with a motion picture apparatus, a continuous film passing through said apparatus and a film magazine, of an interchangeable reel adapted to receive and discharge said film, the core of said reel comprising a pair of oppositely disposed retractible pins having heads on one end thereof; means for holding said pins against retraction; and means engaging said heads for forcing said pins out of retracted position, substantially as described.

16. The combination with a motion picture apparatus, a film magazine, and a continuous film passing into and out of said magazine, of a shaft journalled in said magazine; a film reel support mounted on one end of said shaft; a mutilated gear mounted on the other end of said shaft for intermittently rotating said support; and oppositely disposed film reels carried by said support, the cores of said reels comprising a pair of co-operating retractible pins, said reels being intermittently interchangeable by the tension of said film applied to one of said pins, substantially as described.

17. In motion picture apparatus, a projector, a reel carrying member mounted for rotation, a plurality of reels mounted on said carrying member and adapted by the rotation of said member to be brought successively into winding and unwinding positions, an endless film winding and unwinding in double layers upon the reels, one of the winding layers being received from the unwinding reel and the other from the projector, and one of the unwinding layers being passed to the projector and the other to the winding reel, the film being directly interengaged with the unwinding reel and applying its tension directly to said unwinding reel and positively rotating the carrying member when the film is exhausted from said unwinding reel, and means for resisting rotation of the carrying member while the film is being unwound, the last-named means being controlled by the tension of the unwound portion of the film.

18. In a motion picture apparatus, a projector, a reel carrying member mounted for rotation, a plurality of reels mounted on said carrying member and adapted by the rotation of said member to be brought successively into winding and unwinding positions, an endless film winding and unwinding in double layers upon the reels, one of the winding layers being received from the unwinding reel and the other from the projector, and one of the unwinding layers being passed to the projector and the other to the winding reel, the film being directly interengaged with the unwinding reel and applying its tension directly to said unwinding reel and positively rotating the carrying member when the film is exhausted from said unwinding reel, means for resisting rotation of the carrying member while the film is being unwound, and independent positive driving means acting upon said carrying member and shifting the positions of the reels, after rotation of the carrying member has been initiated by the tension of the unwound film.

19. In a motion picture apparatus, a projector, a reel carrying member mounted for rotation, a plurality of reels mounted on said carrying member and adapted by the rotation of said member to be brought successively into winding and unwinding positions, an endless film winding and unwinding in double layers upon the reels, one of the winding layers being received from the unwinding reel and the other from the projector, and one of the unwinding layers being passed to the projector and the other to the winding reel, the film being directly interengaged with the unwinding reel and applying its tension directly to said unwinding reel and positively rotating the carrying member when the film is exhausted from said unwinding reel, means for resisting rotation of the carrying member while the film is being unwound, independent positive driving means acting upon said carrying member and shifting the positions of the reels, after rotation of the carrying member has been initiated by the tension of the unwound film, and means releasing the engagement of the unwound portion of the film from the unwinding reel after the tension of the unwound portion has initiated the shifting movement of the carrying member.

20. In a motion picture machine, a projector, an endless film adapted to travel continuously through said projector, a reel carrying member mounted for rotation, reels mounted on said carrying member and by the rotation thereof successively brought to winding and unwinding positions, said reels being adapted to interengage with the film and cause the film, by its tension, to move the reel from the unwinding position after the film is exhausted therefrom, and winding of the film upon the other reel has been completed, and means for disengaging the unwound portion of the film from the unwinding reel after movement of the carrier has been initiated and reengaging said reel with the film before it reaches the winding position.

21. In a motion picture machine, a projector, an endless film adapted to travel continuously through said projector, a reel carrying member mounted for rotation, reels mounted on said carrying member and by the rotation thereof successively brought to winding and unwinding positions, said reels being adapted to interengage with the film and cause the film, by its tension, to move the reel from the unwinding position after the film is exhausted therefrom, and winding of the film upon the other reel has been completed, and means for disengaging the unwound portion of the film from the unwinding reel after movement of the carrier has been initiated and reengaging said reel with the film before it reaches the winding position; the reel being caused to retain its interengagement with the film in moving from the winding to the unwinding position and until after the film is unwound and movement of the carrier is initiated.

22. In a motion picture machine, a projector, an endless film adapted to traverse said projector, winding and unwinding reels adapted to wind and unwind said film in double layers, the layers passing to the winding reel being led, respectively, from the projector and from the unwinding reel, and the layers unwound from the unwinding reel being passed, respectively, to the projector and the winding reel, a carrier upon which said reels are mounted, rotatable to bring the reels successively into winding and unwinding positions, each reel being constructed to interengage with the film, and the interengagement with the unwinding reel being maintained to develop tension upon said unwinding reel when the film is exhausted therefrom and positively move the carrier by the direct application of the tension of the film, means for positively completing rotation of the carrier to bring a reel into winding position after rotation has been initiated by the said tension of the film, and means for releasing interengagement of the unwinding portion of the film with the unwinding reel after such movement of the carrier has been initiated and causing re-engagement with said reel of a winding portion of the film as the reel approaches the winding position; the interengagement of the film with the reel in winding position being maintained during the movement of said winding reel to the unwinding position and until the film is unwound therefrom.

In testimony whereof I have signed my name to this specification.

JOHN P. BURNETT.